(12) United States Patent
Ji et al.

(10) Patent No.: US 12,503,080 B2
(45) Date of Patent: Dec. 23, 2025

(54) FILLING DEVICE FOR REPLENISHING WIPER WATER OF VEHICLE

(71) Applicant: Illinois Tool Works Inc., Glenview, IL (US)

(72) Inventors: Junfeng Ji, Shanghai (CN); Yuan Sun, Shanghai (CN); Wenquan Sha, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 347 days.

(21) Appl. No.: 18/128,396

(22) Filed: Mar. 30, 2023

(65) Prior Publication Data

US 2023/0331192 A1 Oct. 19, 2023

(30) Foreign Application Priority Data

Apr. 15, 2022 (CN) .......................... 202210399665.9
Mar. 16, 2023 (CN) .......................... 202310271887.7

(51) Int. Cl.
*B60S 1/50* (2006.01)
*B60S 5/00* (2006.01)

(52) U.S. Cl.
CPC .. *B60S 1/50* (2013.01); *B60S 5/00* (2013.01)

(58) Field of Classification Search
CPC ..................................... B60S 1/50; B60S 5/00
See application file for complete search history.

(56) References Cited

U.S. PATENT DOCUMENTS 9,120,465 B2 * 9/2015 Uyanik ..................... B60S 1/50
10,486,653 B2 * 11/2019 Hoeppel ................. B60S 1/481

FOREIGN PATENT DOCUMENTS

EP 3392099 A1 * 10/2018 ................ B60S 1/50

* cited by examiner

*Primary Examiner* — Timothy L Maust
(74) *Attorney, Agent, or Firm* — McAndrews, Held & Malloy, Ltd.

(57) ABSTRACT

The present application provides a filling device for refilling a liquid storage tank in a vehicle. The filling device includes a support seat, a filling tank, and a connecting device. The support seat is arranged in a vehicle body and defines a containment space. The filling tank is movably connected to the support seat and is movable relative to the support seat between a filling position and a closed position. The filling tank includes a filling space, and a filling port and a liquid outlet that communicate with the filling space. The filling port is hidden in the vehicle body when the filling tank is in the closed position, and when the filling tank is in the filling position, the filling port is accessible from outside the vehicle body, enabling refilling of liquid from the filling port. The connecting device connects the filling tank to the support seat so that the filling tank can be moved in a translational manner relative to the support seat. The connecting device includes a connecting channel that communicates the liquid outlet of the filling tank with the liquid storage tank in the vehicle body.

18 Claims, 6 Drawing Sheets

FILLING DEVICE FOR REPLENISHING WIPER WATER OF VEHICLE

RELATED APPLICATION(S)

The present application claims the benefit of Chinese Patent Application Nos. 2022103996659, filed Apr. 15, 2022, and 2023102718877, filed Mar. 16, 2023, the contents of which are hereby incorporated by reference.

TECHNICAL FIELD

Embodiments of the present application generally relate to a filling device for replenishing liquid (e.g., glass water for wiper) to a liquid storage tank in a vehicle.

BACKGROUND ART

The glass water used in wipers of a vehicle is consumed and needs to be replenished regularly. A liquid storage tank for storing glass water is typically provided in a vehicle for storing glass water for refilling. Existing fuel vehicles typically place liquid storage tanks in the engine compartment, and operators can replenish glass water by opening the engine compartment cover and removing the cover of the liquid storage tank.

SUMMARY OF THE INVENTION

The present application provides a filling device for refilling liquid in a liquid tank in a vehicle. The filling device includes a support seat, a filling tank, and a connecting device. The support seat is arranged in the vehicle body and defines a containment space. The filling tank is movably connected to the support seat and movable relative to the support seat between a filling position and a closed position. The filling tank includes a filling space, and a filling port and a liquid outlet that are in communication with the filling space. Here, the filling port is hidden in the vehicle body when the filling tank is in the closed position, and when the filling tank is in the filling position, the filling port is accessible from outside the vehicle body, enabling refilling of liquid from the filling port. The connecting device connects the filling tank to the support seat such that the filling tank is capable of translational movement relative to the support seat. The connecting device includes a connecting channel that communicates the liquid outlet of the filling tank with the liquid storage tank in the vehicle body.

According to the filling device described above, the connecting device includes a piston rod connected to one of the support seat and the filling tank, and a sleeve connected to the other of the support seat and the filling tank. The piston rod is movably connected in the sleeve, the connecting channel being formed in the piston rod and the sleeve.

According to the filling device described above, the filling device further includes a guide. The guide includes a guide bar disposed on one of the filling tank and the support seat, and a guide slot disposed on the other of the filling tank and the support seat. The guide bar is inserted into the guide slot and movable in the guide slot. The guide bar extends parallel to the piston rod.

According to the filling device described above, the guide and the connecting device are respectively disposed adjacent to opposite ends in a length direction of the filling tank.

According to the filling device described above, the filling device further includes a drive spring. The drive spring is provided between the piston rod and the sleeve. The drive spring is configured to be compressed as the filling tank moves from the filling position to the closed position and configured to drive the filling tank to move from the closed position to the filling position by a resilience force.

According to the filling device described above, the filling device further includes a damping device. The damping device includes a damper disposed on one of the filling tank and the support seat and a damping gear connected with the damper, and a rack disposed on the other of the filling tank and the support seat. The damping gear meshes with the rack. The rack extends parallel to the piston rod.

According to the filling device described above, the connecting device includes at least two connecting rods connecting the support seat and the filling tank. The at least two connecting rods are rotatably connected with the support seat and the filling tank, and the connecting channel is formed in one connecting rod of the at least two connecting rods. The at least two connecting rods are disposed adjacent to opposite ends in the length direction of the filling tank, respectively.

According to the filling device described above, the at least two connecting rods include four connecting rods, the four connecting rods being provided in two rows in a height direction of the filling tank, each row being provided with two of the connecting rods, and two of the connecting rods in each row being respectively provided adjacent to opposite ends in the length direction of the filling tank.

According to the filling device described above, one of the at least two connecting rods is connected to the support seat by a spool. The filling device further includes a drive spring. The drive spring is a torsion spring sleeved on the spool. The drive spring is configured to be compressed as the filling tank moves from the filling position to the closed position and configured to drive the filling tank to move from the closed position to the filling position by a resilience force.

According to the filling device described above, the filling device further includes a damping device. The damping device includes a damper disposed on the support seat and a damping gear connected with the damper, and a mating gear disposed on the spool. The damping gear meshes with the mating gear.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DESCRIPTION OF EMBODIMENTS

Various specific embodiments of the present application will be described below with reference to the attached drawings that form a part of the present specification. It should be understood that while terms denoting orientation, such as "front", "rear", "upper", "lower", "left", "right", "top", "bottom", etc., are used in the present application to describe various exemplary structural parts and elements of the present application, these terms are used herein for convenience of illustration only and are determined based on the exemplary orientations shown in the appended drawings. Since the examples disclosed in the present application may be disposed in different orientations, these terms denoting orientation are for illustrative purposes only and should not be considered as limiting.

The present application exemplifies some examples of a filling device for refilling liquid to a liquid storage tank in a vehicle, wherein FIGS. 1A to 4 illustrate a filling device 100 according to a first example of the present application and FIGS. 5A to 6B illustrate a filling device 500 according to a second example of the present application. An operator may replenish the liquid storage tank in the vehicle via the filling device by operating the filling device of the present application.

Figure 1A:
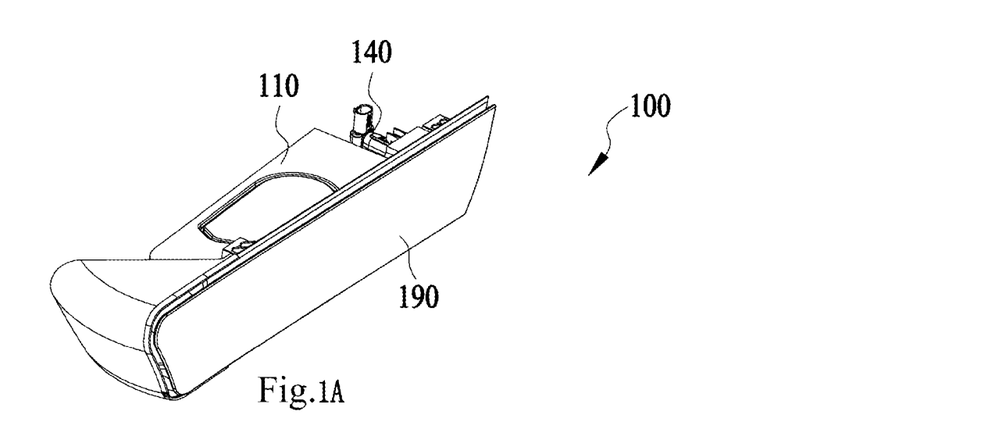
FIG. 1A is a perspective view of a filling device according to a first example of the present application in which a filling tank thereof is in a closed position.
Figure 1B:
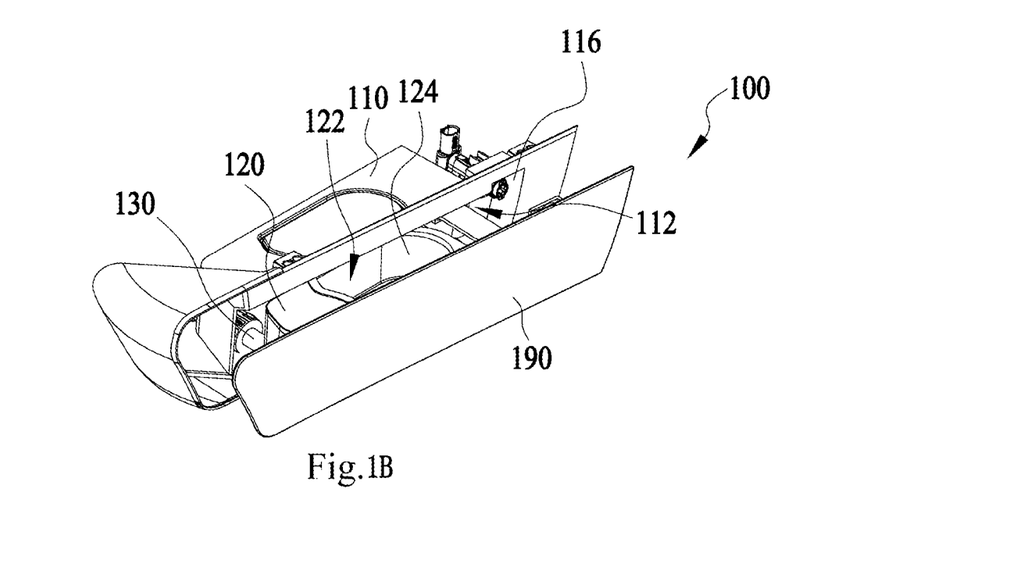
FIG. 1B is a perspective view of the filling device shown in FIG. 1A when the filling tank thereof is in a filling position.

FIGS. 1A and 1B show perspective views of the filling device 100 according to the first example of the present application when the filling tank thereof is in the closed position and in the filling position, respectively. As shown in FIGS. 1A and 1B, the filling device 100 includes a support seat 110, a filling tank 120, and a connecting device 130 for movably connecting the filling tank 120 to the support seat 110. The filling device 100 also includes a cover plate 190 secured to the filling tank 120. The support seat 110 is used to support the filling tank 120, and the filling tank 120 is used to receive the replenished liquid and to direct the replenished liquid into the liquid storage tank 210 (as indicated by the dashed lines in FIG. 2B) in the vehicle. The connecting device 130 is used to enable translational movement of the filling tank 120 relative to the support seat 110 and is capable of fluidly communicating the filling tank 120 with the liquid storage tank 210 in the vehicle at all times (even during movement of the filling tank 120 relative to the support seat 110).

The support seat 110 is fixedly arranged in the vehicle body, and includes a containment space 112, and an opening 116 and a communication port 215 (FIG. 2B) in communication with the containment space 112, the opening 116 being located on a side of the support seat 110, and the communication port 215 being provided at the bottom of the support seat 110. The filling tank 120 includes a filling space 122, a filling port 124 and a liquid outlet 225 in communication with the filling space 122 (FIG. 2B), where the filling port 124 is located at the top of the filling tank 120 and the liquid outlet 225 is located at the bottom of the filling tank 120. The bottom of the filling tank 120 is set to be generally inclined such that the liquid outlet 225 is in a lower position, thereby enabling a filling liquid in the filling tank 120 to flow to the liquid outlet 225 faster and smoother. The filling tank 120 is capable of entering and exiting the containment space 112 of the support seat 110 via the opening 116, thereby moving between the closed position and the filling position thereof. The cover plate 190 is used to close the opening 116 of the support seat 110. For example, the filling device 100 may be arranged in a side opening of the vehicle body, with the cover plate 190 positioned in the side opening of the vehicle body and flush with an outer sheet metal of the vehicle body when the filling tank 120 is in its closed position. The movement of the filling tank 120 between the closed position and the filling position is a translational movement relative to the support seat 110, such translational movement being achieved by the connecting device 130. When in the closed position, the filling tank 120 is moved into the containment space 112 of the support seat 110, thereby blocking the filling port 124 from being accessible from the outside. When in the filling position, a majority of the filling tank 120 is moved out from the containment space 112 of the support seat 110, and the filling port 124 is exposed and accessible from the outside, so that liquid (e.g., glass water) can be filled through the filling port 124.

Figure 2A:
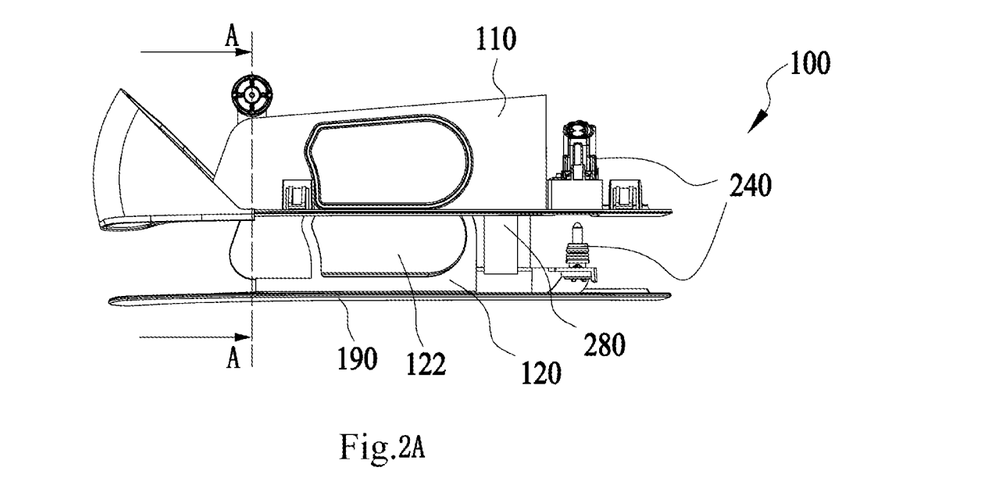
FIG. 2A is a top view of the filling device shown in FIG. 1A when the filling tank thereof is in the filling position.
Figure 2B:
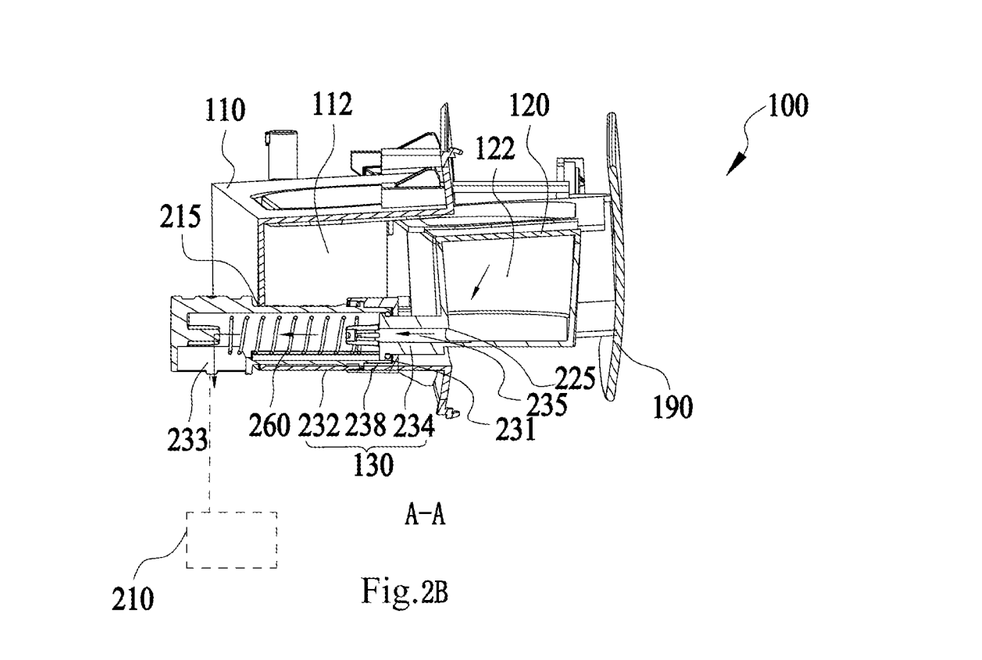
FIG. 2B is a cross-sectional view along the A-A line in FIG. 2A.

FIG. 2A is a top view of the filling device 100 shown in FIG. 1A with the filling tank 120 in its filling position, and FIG. 2B is a cross-sectional view along the A-A line in FIG. 2A. As shown in FIG. 2A, the filling device 100 further includes a guide 280 and a locking device 240. The guide 280 is used to further guide translational movement of the filling tank 120 relative to the support seat 110, and the locking device 240 is used to lock the filling tank 120 in the support seat 110 after the filling tank 120 is moved to the closed position.

As shown in FIG. 2B, the connecting device 130 includes a sleeve 232, a piston rod 234 and a cap 238. The sleeve 232 is provided through the communication port 215 of the support seat 110 and fixed to the support seat 110. A distal end of the sleeve 232 is located outside the support seat 110 and has an outlet 233 connected to the liquid storage tank 210 located in the vehicle body. A proximal end of the sleeve 232 is located in the containment space 112 of the support seat 110 and has an inlet 231. The distal end of the piston rod 234 is inserted into the sleeve 232 from the inlet 231 of the sleeve 232 and the proximal end of the piston rod 234 is fixedly connected to the filling tank 120, for example by integral molding. The piston rod 234 has a piston rod channel 235 that communicates the liquid outlet 225 of the filling tank 120 with the sleeve 232 to communicate the liquid outlet 225 of the filling tank 120 with a liquid storage device in the vehicle body through a connecting channel formed by the piston rod channel 235 and the sleeve 232. The cap 238 is provided around the piston rod 234 and seals the proximal end of the sleeve 232 to block the piston rod 234 from coming out of the sleeve 232. The piston rod 234 is capable of linear movement in the sleeve 232, thus enabling translational movement of the filling tank 120 relative to the support seat 110. In other examples, the positions of the piston rod 234 and the sleeve 232 may be interchanged. That is, when the piston rod 234 is connected to the support seat 110 and the sleeve 232 is connected to the filling tank 120, it is also possible to achieve translational movement of the filling tank 120 relative to the support seat 110 by linear movement of the piston rod 234 relative to the sleeve 232.

Still as shown in FIG. 2B, the filling device 100 further includes a drive spring 260 for providing driving force for movement of the filling tank 120 relative to the support seat 110. The drive spring 260 is provided between the distal end of the sleeve 232 and the distal end of the piston rod 234. When an operator pushes the filling tank 120 into the support seat 110, the piston rod 234 moves into the sleeve 232, and the piston rod 234 compresses the drive spring 260, so that the filling tank 120 can reach the closed position. When the drive spring 260 recovers to its initial state, the resilience force of the drive spring 260 is able to drive the piston rod 234 out of the sleeve 232, while the movement of the piston rod 234 drives the filling tank 120 out of the support seat 110 such that the filling tank 120 reaches the filling position.

The locking device 140 is, for example, a push-type locking device. When an operator pushes the filling tank 120 in the filling position to move inwardly into the support seat 110 to reach its closed position, the locking device 140 locks the filling tank 120 to the support seat 110, thereby locking it in the closed position. When the operator pushes the filling tank 120 in the closed position, the locking device 140 can be unlocked such that the filling tank 120 moves outwardly to the filling position under the action of the drive spring 260. Of course, the locking device 140 may also be other types of locking devices.

As shown by the arrows in FIG. 2B, when the filling tank 120 is in its filling position, liquid replenished through the filling port 124 of the filling tank 120 can reach the liquid storage tank 210 in the vehicle via the connecting channel formed by the sleeve 232 and the piston rod 234.

Figure 3:
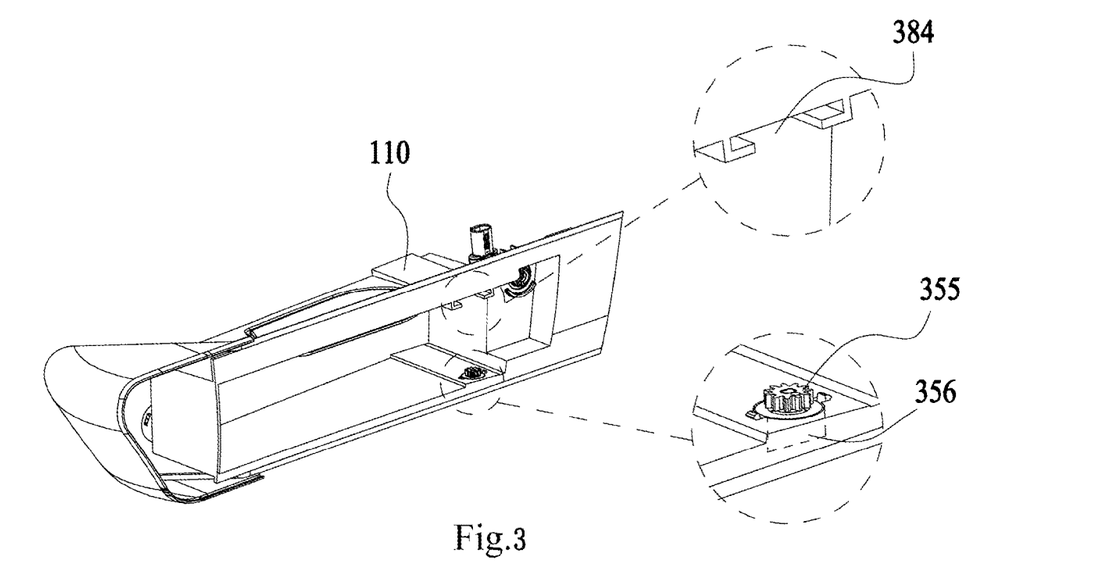
FIG. 3 is a perspective view of a support seat of the filling device shown in FIG. 1A.
Figure 4:
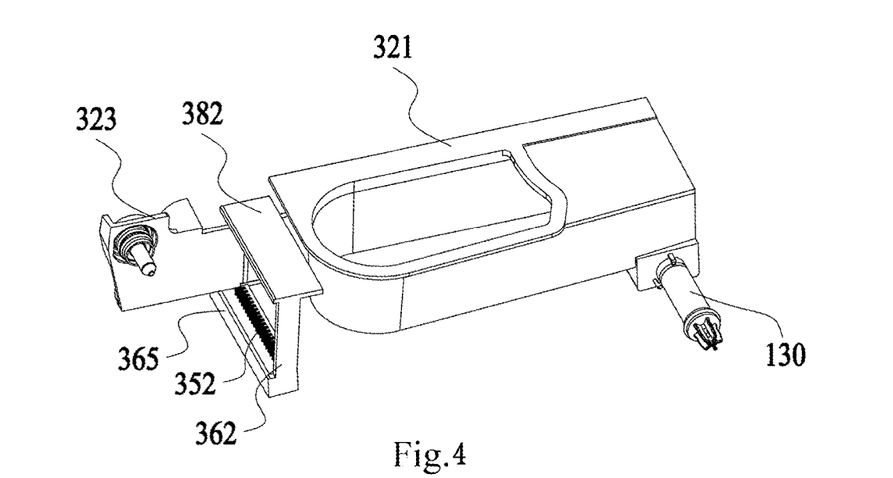
FIG. 4 is a perspective view of the filling tank of the filling device shown in FIG. 1A.

FIG. 3 is a perspective view of the support seat 110 of the filling device 100 shown in FIG. 1A, and FIG. 4 is a perspective view of the filling tank 120 of the filling device 100 shown in FIG. 1A. As shown in FIGS. 3 and 4, the guide 280 of the filling device 100 includes a guide bar 382 disposed on the filling tank 120 and a guide slot 384 disposed on the support seat, the guide bar 382 being inserted into the guide slot 384 and movable in the guide slot 384. The guide 280 can further guide the direction of movement of the filling tank 120. Although the connecting device 130 including the piston rod 234 and the sleeve 232 can also enable translational movement of the filling tank 120 relative to the support seat 110 without the guide 280 being provided, the translational movement of the filling tank 120 relative to the support seat 110 can be made smoother and more stable by providing the guide 280 and disposing the guide 280 and the connecting device 130 adjacent to opposite ends in the length direction of the filling tank 120, respectively.

Specifically, the filling tank 120 includes a tank body 321 and a mounting plate 323 extending from a first side of the length direction of the tank body 321. The tank body 321 defines the filling space 122, and the filling port 124 and the liquid outlet 225 are disposed on the tank body 321. The piston rod 234 of the connecting device 130 is provided below a second side of the length direction of the tank body 321. The guide bar 382 is provided on the mounting plate 323 of the filling tank 120 and protrudes towards the support seat 110 and extends parallel to the piston rod 234. The guide bar 382 and the piston rod 234 are respectively disposed adjacent to opposite ends in the length direction of the filling tank 120.

Still as shown in FIGS. 3 and 4, the filling device 100 further includes a damping device configured to enable the filling tank 120 to move more smoothly and stably relative to the support seat 110 during the movement of the filling tank 120 driven by the drive spring 260. In the present example, the damping device includes a rack 352 disposed on the filling tank 120, and a damping gear 355 and a damper 356 disposed on the support seat 110. The rack 352 is also provided on the mounting plate 323 of the filling tank 120, and is located below the guide bar 382 and extends parallel to the piston rod 234. The damper 356 may be a variety of types of dampers. The damping gear 355 is connected with the damper 356 by a spool such that damper 356 is able to control the rotational speed of the damping gear 355. The damping gear 355 is meshed with the rack 352. As a result, the damping device is capable of slowing down the moving speed of the filling tank 120 as the filling tank 120 is driven by the drive spring 260 to suddenly accelerate movement relative to the support seat 110, and this enables smoother and stabler movement of the filling tank 120 when the filling device 100 uses a spring as a drive device.

It is to be noted that in other examples, the positions of the rack and the damping gear (including a damper) in the damping device on the support seat 110 and the filling tank 120 may be interchanged as long as the two work together to create a damping effect on the support seat 120. The positions of the guide bar and the guide slot in the guide device on the support seat 110 and the filling tank 120 may also be interchanged, as long as the two work together to make the translational movement of the support seat 120 smoother and more stable.

Still as shown in FIG. 4, the filling device 100 further includes a stop 362 disposed at an end of the rack 352 proximate the support seat 110 for preventing the damping gear 355 from disengaging from the rack 352 when the filling tank 120 is in the filling position. In the example shown in the figures, the stop 362 extends from the rack 352 to the guide bar 382 above the rack 352.

In addition, the filling device 100 also includes a stiffener plate 365, with both ends of the stiffener plate 365 connected to the mounting plate 323 and the stop 362, respectively, for making the stop 362 and the rack 352 more stable during operation.

Figure 5A:
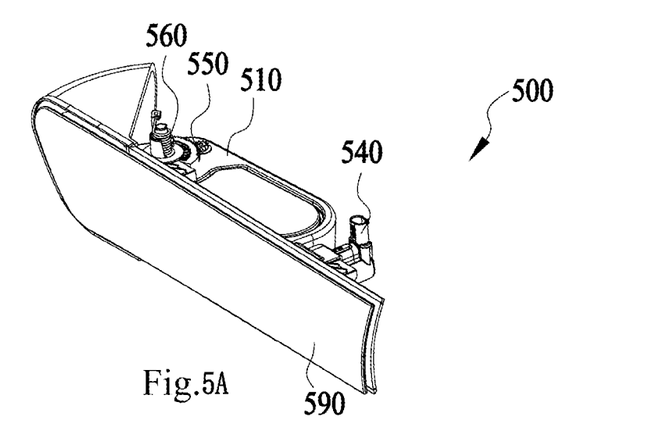
FIG. 5A is a perspective view of a filling device according to a second example of the present application in which a filling tank thereof is in a closed position.
Figure 5B:
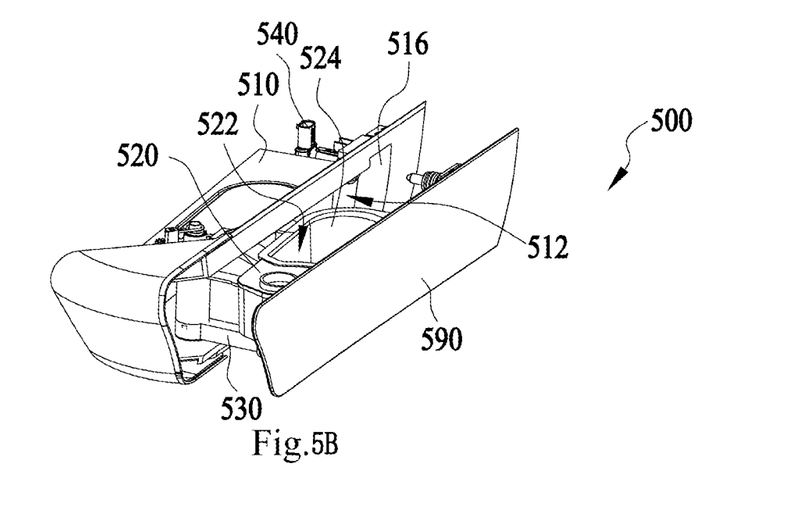
FIG. 5B is a perspective view of the filling device shown in FIG. 5A when the filling tank thereof is in a filling position.
Figure 5C:
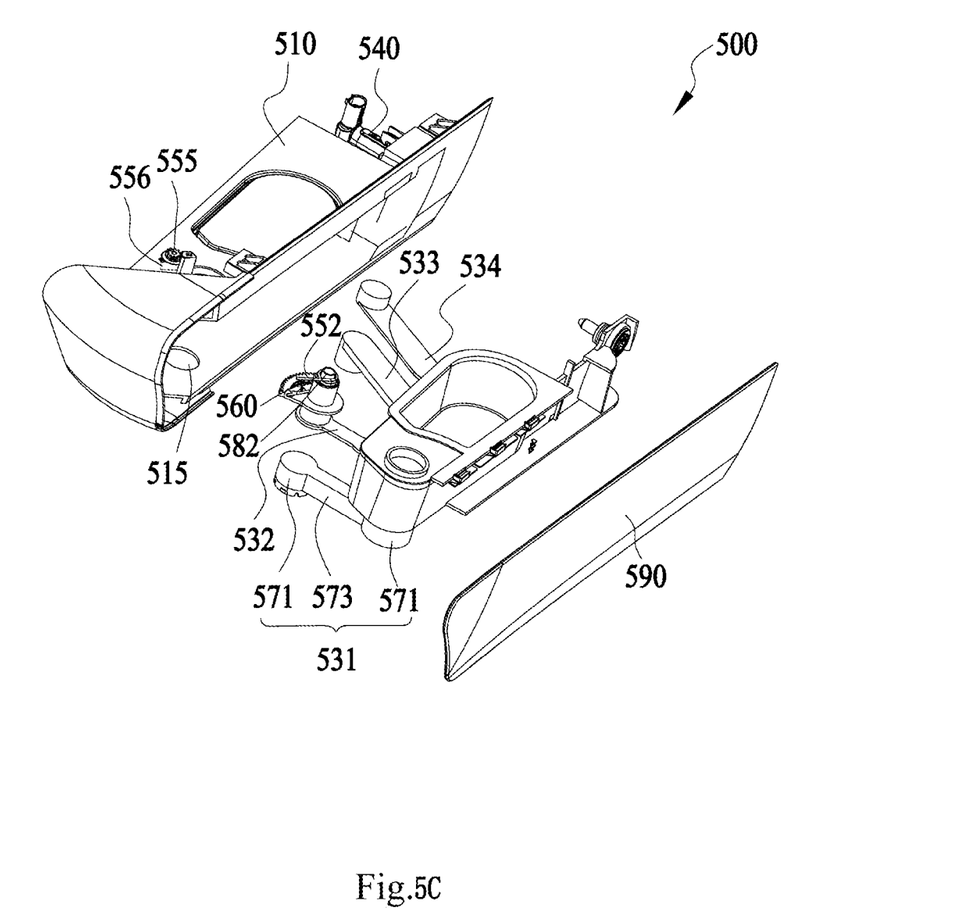
FIG. 5C is an exploded view of the filling device shown in FIG. 5A.

FIGS. 5A to 5C illustrate specific structures of a filling device 500 according to a second example of the present application, wherein FIG. 5A is a perspective view of the filling device 500 when a filling tank thereof is in a closed position, FIG. 5B is a perspective view of the filling device 500 when its filling tank is in a filling position, and FIG. 5C is an exploded view of the filling device 500. Most of the structure of the filling device 500 is the same as the filling device 100 of the first example, with the main difference being that a connecting device 530 of the filling device 500 is different from the connecting device 130 of the filling device 100 of the first example, and a damping device 550 and a drive spring 560 of the filling device 500 are also different from the damping device and the drive spring 560 of the first example. Furthermore, the filling device 500 no longer needs to be provided with a guide in the filling device 100 of the first example due to the structure of its connecting device 530.

As shown in FIGS. 5A and 5B, the filling device 500 includes a support seat 510, a filling tank 520, a connecting device 530, a locking device 540, a damping device 550, a drive spring 560, and a cover plate 590. The support seat 510 includes a containment space 512, and an opening 516 and a communication port 515 (FIG. 5C) in communication with the containment space 512. The opening 516 is located at a side of the support seat 510, and the communication port 515 is provided at a bottom of the support seat 510. The filling tank 520 includes a filling space 522, a filling port 524 and a liquid outlet 625 in communication with the filling space 522 (FIG. 6B), where the filling port 524 is located at the top of the filling tank 520 and the liquid outlet 625 is located at the bottom of the filling tank 520.

As shown in FIG. 5C, the connecting device 530 includes four connecting rods, namely a first connecting rod 531, a second connecting rod 532, a third connecting rod 533, and a fourth connecting rod 534. Both ends of each of these four connecting rods are rotatably connected with the support seat 510 and the filling tank 520, respectively, such that the filling tank 520 is capable of moving translationally relative to the support seat 510 between a closed position and a filling position thereof. In a height direction of the filling tank 520, these four connecting rods are set in two rows, and each row is provided with two connecting rods. That is, the first connecting rod 531 and the third connecting rod 533 are set in a lower row, and the second connecting rod 532 and the fourth connecting rod 534 are set in an upper row. Moreover, in a length direction of the filling tank 520, the two connecting rods in each row are disposed adjacent to opposite ends of the filling tank 520, respectively. Arranging the four connecting rods as described above may enable smooth and stable movement of the filling tank 520 relative to the support seat 510 without the need to set the guide in the filling device 100 of the first example. Of course, in other examples, the number of connecting rods is not limited to four, as long as at least two are provided to enable translational movement of the filling tank 520 relative to the support seat 510.

The first connecting rod 531 includes a rod portion 573 and spool joints 571 disposed at opposite ends of the rod portion 573, and the two joints 571 pass through the liquid outlet 625 of the filling tank 520 and the communication port 515 of the support seat 510, respectively, and rotatably connect the first connecting rod 531 to the filling tank 520 and the support seat 510. The first connecting rod 531 includes a connecting channel 535 (see FIG. 6B) that runs through the rod portion 573 and the joints 551 of the first connecting rod 531, and as a result, the connecting channel 535 communicates the liquid outlet 625 of the filling tank 520 with the liquid storage tank 610 (see FIG. 6B) in the vehicle body.

The second connecting rod 532 is connected to the support seat 510 through a spool 582. The spool 582 is fixedly connected with the second connecting rod 532, and the spool 582 is inserted into a hole in the support seat 510. The drive spring 560 is a torsion spring disposed about a top end of the spool 582, and one end of the drive spring is connected with the spool 582 while the other end is connected with the support seat 510. When the filling tank 520 is moved from the filling position to the closed position, the filling tank 220 drives the first connecting rod 532 to rotate, and the second connecting rod 532 in turn drives the spool 582 to rotate, thereby compressing the drive spring 560. When the locking device 540 is unlocked, the drive spring 560 is released, thereby driving the spool 582 to rotate and drive the second connecting rod 532. The second connecting rod 532 in turn drives the filling tank 520 to move from the closed position to the filling position.

The damping device 550 includes a gear set formed by a pair of gears and a damper that acts on one of the gears, and the pair of gears are connected to the spool 582 and the support seat 510, respectively, so that the rotational speed of the spool 582 can be controlled when the spool 582 is rotated relative to the support seat 210, thereby enabling the filling tank 520 to move at a uniform speed relative to the support seat 510. More specifically, in the illustrated example, the damping device 550 includes a damper 556, a damping gear 555, and a mating gear 552. The damper 556 and the damping gear 555 are disposed in a similar manner to the damper and the damping gear in the first example, and thus will not be described herein. The mating gear 552 is fixed on the spool 582 and is generally fan-shaped.

Figure 6A:
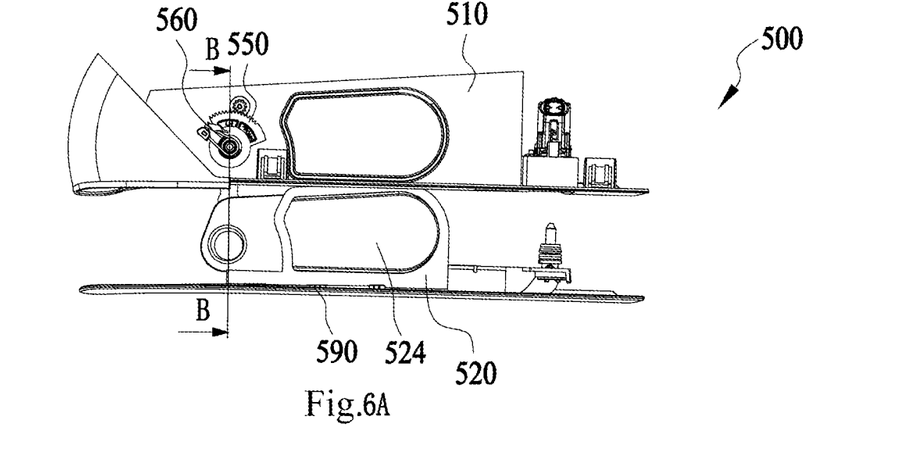
FIG. 6A is a top view of the filling device shown in FIG. 5A when the filling tank thereof is in the filling position.
Figure 6B:
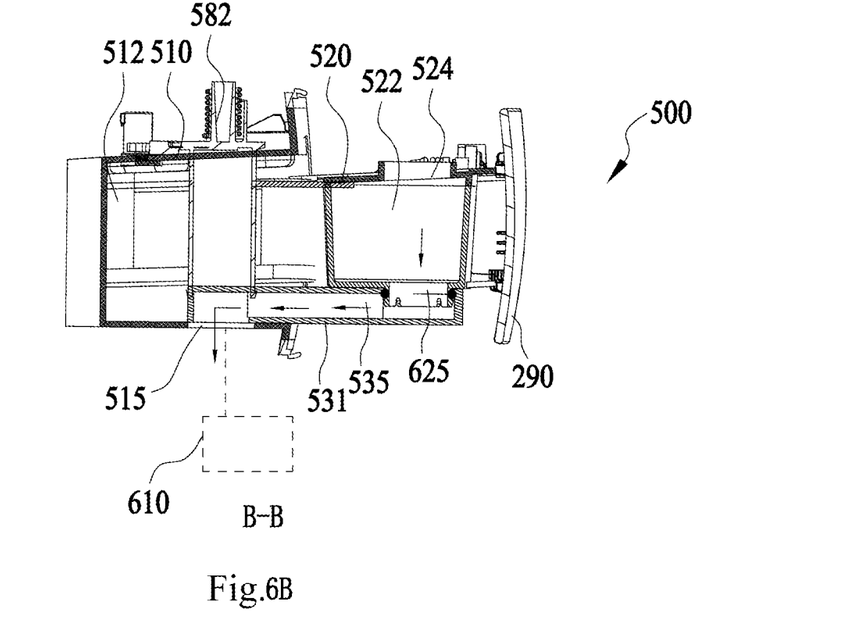
FIG. 6B is a cross-sectional view along the B-B line in FIG. 6A.

As shown in FIGS. 6A and 6B, when the filling tank 520 is moved to the filling position relative to the support seat 510, the operator fills liquid (e.g., glass water) from the filling port 524 of the filling tank 520. Along the arrows shown in FIG. 6B, the liquid enters the connecting channel 535 in the connecting device 530 via the liquid outlet 625 of the filling tank 520, and flows into the liquid storage device in the vehicle body from the communication port 515 of the support seat 510.

In the filling device according to an example of the present application, since the filling tank is moved in a translational manner relative to the support seat, the filling port on the filling tank can be exposed to the greatest extent, thereby enabling the filling port to match a filling liquid container port with a wider size range. Moreover, since the filling device according to the example of the present application has good support for the filling tank in the length direction of the filling tank, the filling tank has a high pressing strength and can well support a filling liquid container with a certain weight.

Although the present application has been described in connection with examples of the examples outlined above, various alternatives, modifications, variations, improvements, and/or substantial equivalents, whether known or foreseeable now or in the near future, may be apparent to those having at least ordinary skill in the art. In addition, the technical effects and/or technical problems described in the present specification are exemplary and not limiting; therefore, the disclosure in the present specification may be used to solve other technical problems and have other technical effects and/or may solve other technical problems. Therefore, examples of the present application as set forth above are intended to be illustrative and not limiting. Various changes may be made without departing from the spirit or scope of the present application. Therefore, the present application is intended to include all known or earlier developed alternatives, modifications, variations, improvements, and/or substantial equivalents.

What is claimed is:

1. A filling device for refilling a liquid storage tank in a vehicle, comprising:
   a support seat, this support seat is arranged in a vehicle body, the support seat defining a containment space;
   a filling tank movably connected to the support seat and movable relative to the support seat between a filling position and a closed position, the filling tank including a filling space, and a filling port and a liquid outlet in communication with the filling space, wherein the filling port is hidden in the vehicle body when the filling tank is in the closed position, and when the filling tank is in the filling position, the filling port is accessible from outside the vehicle body, enabling refilling of liquid from the filling port;
   a connecting device connecting the filling tank to the support seat such that the filling tank is capable of moving in a translational manner relative to the support seat, the connecting device including a connecting channel that communicates the liquid outlet of the filling tank with the liquid storage tank in the vehicle body,
      wherein the connecting device includes a piston rod connected to one of the support seat and the filling tank, and a sleeve connected to the other of the support seat and the filling tank, the piston rod being movably connected in the sleeve, the connecting channel being formed in the piston rod and the sleeve.

2. The filling device (100) according to claim 1, further comprising:
a guide including a guide bar disposed on one of the filling tank and the support seat, and a guide slot disposed on the other of the filling tank and the support seat, the guide bar being inserted into the guide slot and movable in the guide slot;
wherein the guide bar extends parallel to the piston rod.

3. The filling device according to claim 2, wherein:
the guide and the connecting device are respectively disposed adjacent to opposite ends of the filling tank in a length direction.

4. The filling device according to claim 3, further comprising:
a drive spring disposed between the piston rod and the sleeve, the drive spring configured to be compressed when the filling tank is moved from the filling position to the closed position and configured to drive the filling tank to move from the closed position to the filling position by a resilience force.

5. The filling device according to claim 4, further comprising:
a damping device including a damper disposed on one of the filling tank and the support seat and a damping gear connected with the damper, and a rack disposed on the other of the filling tank and the support seat, the damping gear being meshed with the rack;
wherein the rack extends parallel to the piston rod.

6. A filling device for refilling a liquid storage tank in a vehicle, comprising:
a support seat, this support seat is arranged in a vehicle body, the support seat defining a containment space;
a filling tank movably connected to the support seat and movable relative to the support seat between a filling position and a closed position, the filling tank including a filling space, and a filling port and a liquid outlet in communication with the filling space, wherein the filling port is hidden in the vehicle body when the filling tank is in the closed position, and when the filling tank is in the filling position, the filling port is accessible from outside the vehicle body, enabling refilling of liquid from the filling port;
a connecting device connecting the filling tank to the support seat such that the filling tank is capable of moving in a translational manner relative to the support seat, the connecting device including a connecting channel that communicates the liquid outlet of the filling tank with the liquid storage tank in the vehicle body,
wherein the connecting device includes at least two connecting rods connecting the support seat and the filling tank, the at least two connecting rods being rotatably connected with the support seat and the filling tank, the connecting channel being formed in one connecting rod of the at least two connecting rods, the at least two connecting rods being respectively disposed adjacent to opposite ends in a length direction of the filling tank.

7. The filling device according to claim 6, wherein:
the at least two connecting rods include four connecting rods, the four connecting rods being provided in two rows in a height direction of the filling tank, each row being provided with two of the connecting rods, and two of the connecting rods in each row being provided adjacent to opposite ends in the length direction of the filling tank, respectively.

8. The filling device according to claim 6, wherein:
one of the at least two connecting rods is connected to the support seat by a spool;
the filling device further includes a drive spring that is a torsion spring sleeved on the spool, the drive spring configured to be compressed when the filling tank is moved from the filling position to the closed position and configured to drive the filling tank to move from the closed position to the filling position by a resilience force.

9. The filling device according to claim 8, further comprising:
a damping device including a damper disposed on the support seat and a damping gear connected with the damper, and a mating gear disposed on the spool, the damping gear being meshed with the mating gear.

10. A filling device for refilling a liquid storage tank in a vehicle, comprising:
a support seat arranged in a vehicle body and defining a containment space;
a filling tank movably connected to the support seat and movable relative to the support seat between a filling position and a closed position, the filling tank including a filling space, a filling port in communication with the filling space, and a liquid outlet in communication with the filling space, wherein the filling port is concealed within the vehicle body when the filling tank is in the closed position and is accessible from outside the vehicle body when in the filling position; and
a connecting device connecting the filling tank to the support seat and enabling movement of the filling tank relative to the support seat, the connecting device including:
at least one connecting rod coupled to both the support seat and the filling tank, and/or
a piston rod and sleeve arrangement in which the piston rod is slidably disposed within the sleeve, the piston rod and sleeve defining a connecting channel that fluidly communicates the liquid outlet of the filling tank with the liquid storage tank in the vehicle body.

11. The filling device according to claim 10, wherein:
the connecting device includes a piston rod connected to one of the support seat and the filling tank, and a sleeve connected to the other of the support seat and the filling tank, the piston rod being movably connected in the sleeve, the connecting channel being formed in the piston rod and the sleeve.

12. The filling device according to claim 11, further comprising:
a guide including a guide bar disposed on one of the filling tank and the support seat, and a guide slot disposed on the other of the filling tank and the support seat, the guide bar being inserted into the guide slot and movable in the guide slot;
wherein the guide bar extends parallel to the piston rod.

13. The filling device according to claim 12, wherein:
the guide and the connecting device are respectively disposed adjacent to opposite ends of the filling tank in a length direction.

14. The filling device according to claim 13, further comprising:
a drive spring disposed between the piston rod and the sleeve, the drive spring configured to be compressed when the filling tank is moved from the filling position to the closed position and configured to drive the filling tank to move from the closed position to the filling position by a resilience force.

15. The filling device according to claim 14, further comprising:
a damping device including a damper disposed on one of the filling tank and the support seat and a damping gear connected with the damper, and a rack disposed on the other of the filling tank and the support seat, the damping gear being meshed with the rack;
wherein the rack extends parallel to the piston rod.

16. The filling device according to claim 10, wherein:
the at least two connecting rods include four connecting rods, the four connecting rods being provided in two rows in a height direction of the filling tank, each row being provided with two of the connecting rods, and two of the connecting rods in each row being provided adjacent to opposite ends in the length direction of the filling tank, respectively.

17. The filling device according to claim 10, wherein:
one of the at least two connecting rods is connected to the support seat by a spool;
the filling device further includes a drive spring that is a torsion spring sleeved on the spool, the drive spring configured to be compressed when the filling tank is moved from the filling position to the closed position and configured to drive the filling tank to move from the closed position to the filling position by a resilience force.

18. The filling device according to claim 17, further comprising:
a damping device including a damper disposed on the support seat and a damping gear connected with the damper, and a mating gear disposed on the spool, the damping gear being meshed with the mating gear.

* * * * *